(12) United States Patent
Montgomery, Jr.

(10) Patent No.: US 9,057,933 B1
(45) Date of Patent: Jun. 16, 2015

(54) PROTECTIVE ENCLOSURE ASSEMBLY

(71) Applicant: Charles C. Montgomery, Jr., Middleton, ID (US)

(72) Inventor: Charles C. Montgomery, Jr., Middleton, ID (US)

(*) Notice: Subject to any disclaimer, the term of this patent is extended or adjusted under 35 U.S.C. 154(b) by 0 days.

(21) Appl. No.: 14/199,314

(22) Filed: Mar. 6, 2014

(51) Int. Cl.
*G03B 17/56* (2006.01)
*A45C 11/38* (2006.01)

(52) U.S. Cl.
CPC .............. *G03B 17/561* (2013.01); *A45C 11/38* (2013.01)

(58) Field of Classification Search
CPC ........................................................ A45C 11/38
USPC ............................................................ 396/427
See application file for complete search history.

(56) References Cited

U.S. PATENT DOCUMENTS

| | | | |
|---|---|---|---|
| 5,455,625 A | 10/1995 | Englander | |
| 6,226,448 B1* | 5/2001 | Takagi et al. | 386/358 |
| 6,449,431 B1* | 9/2002 | Cuddeback et al. | 396/27 |
| 6,787,775 B1* | 9/2004 | Bielefeld et al. | 250/330 |
| 7,066,662 B2 | 6/2006 | Cuddeback et al. | |
| 7,345,707 B1 | 3/2008 | McClain | |
| 7,767,963 B1* | 8/2010 | Fujii | 250/330 |
| D626,614 S | 11/2010 | Wood et al. | |
| 7,929,847 B2* | 4/2011 | Yim | 396/27 |
| 2002/0159770 A1 | 10/2002 | Moultrie, Jr. | |
| 2009/0096918 A1* | 4/2009 | Montelongo | 348/375 |
| 2009/0194443 A1* | 8/2009 | Cuddeback | 206/316.2 |
| 2009/0201412 A1 | 8/2009 | Ament, Jr. | |
| 2012/0307127 A1 | 12/2012 | Qian | |
| 2014/0015981 A1* | 1/2014 | Dietl | 348/159 |

* cited by examiner

*Primary Examiner* — Christopher Mahoney
*Assistant Examiner* — Linda B Smith

(57) ABSTRACT

A protective enclosure assembly for housing a wildlife surveillance camera includes a housing positionable proximate a stanchion. The housing has a camera aperture extending therethrough. A cable is operationally coupled between the housing and the stanchion. The housing is retained on the stanchion. A spacer is positionable within the housing. A camera is positioned within the spacer. The camera is retained proximate the camera aperture. A door is operationally coupled to the housing. The door selectively closes the housing.

14 Claims, 5 Drawing Sheets

PROTECTIVE ENCLOSURE ASSEMBLY

BACKGROUND OF THE DISCLOSURE

Field of the Disclosure

The disclosure relates to protective enclosure devices and more particularly pertains to a new protective enclosure device for housing a wildlife surveillance camera.

SUMMARY OF THE DISCLOSURE

An embodiment of the disclosure meets the needs presented above by generally comprising a housing positionable proximate a stanchion. The housing has a camera aperture extending therethrough. A cable is operationally coupled between the housing and the stanchion. The housing is retained on the stanchion. A spacer is positionable within the housing. A camera is positioned within the spacer. The camera is retained proximate the camera aperture. A door is operationally coupled to the housing. The door selectively closes the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
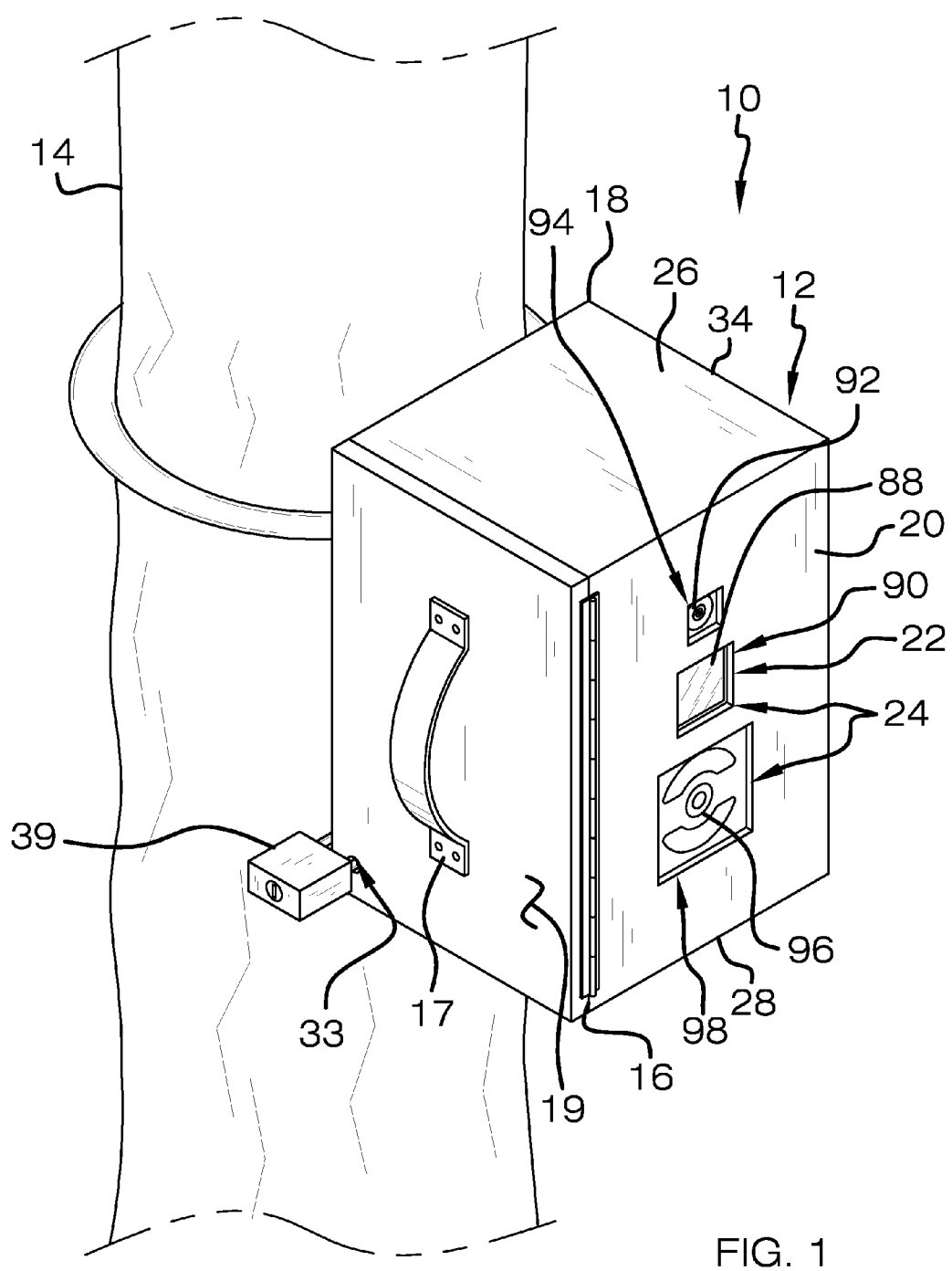
FIG. 1 is an in-use view of a protective enclosure assembly according to an embodiment of the disclosure.
Figure 2:
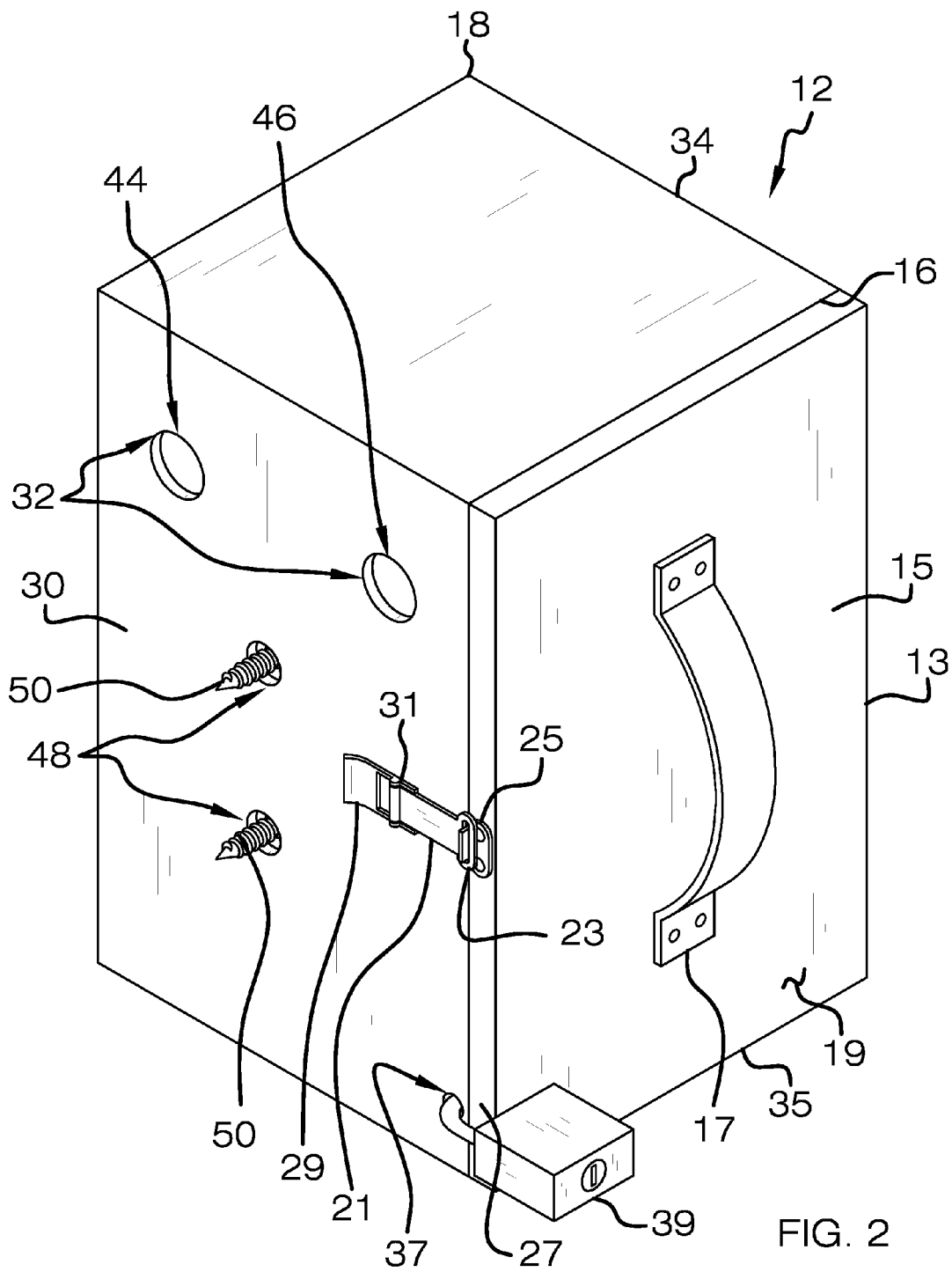
FIG. 2 is a top perspective view of an embodiment of the disclosure.
Figure 3:
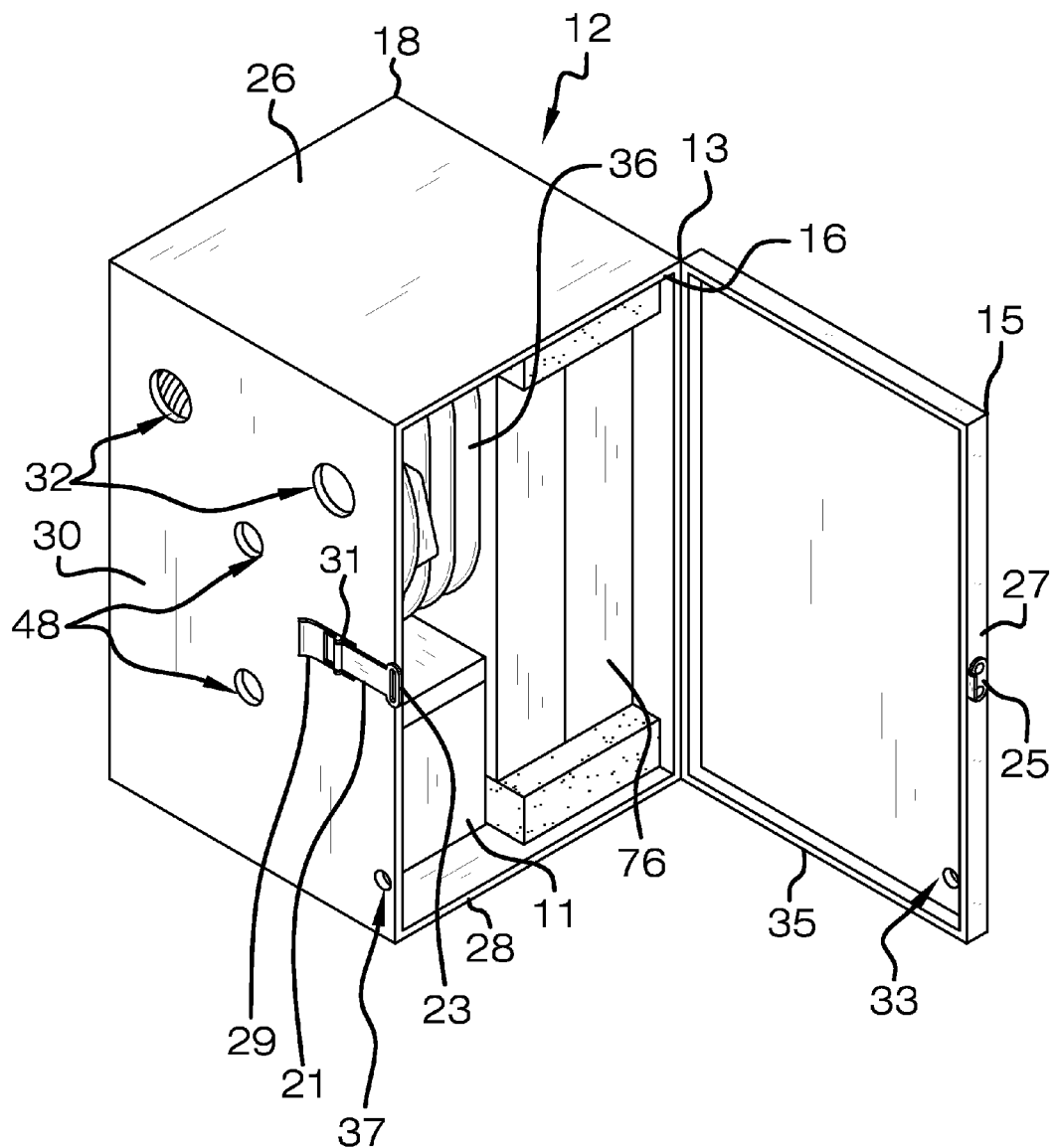
FIG. 3 is a right side perspective view of an embodiment of the disclosure.
Figure 4:
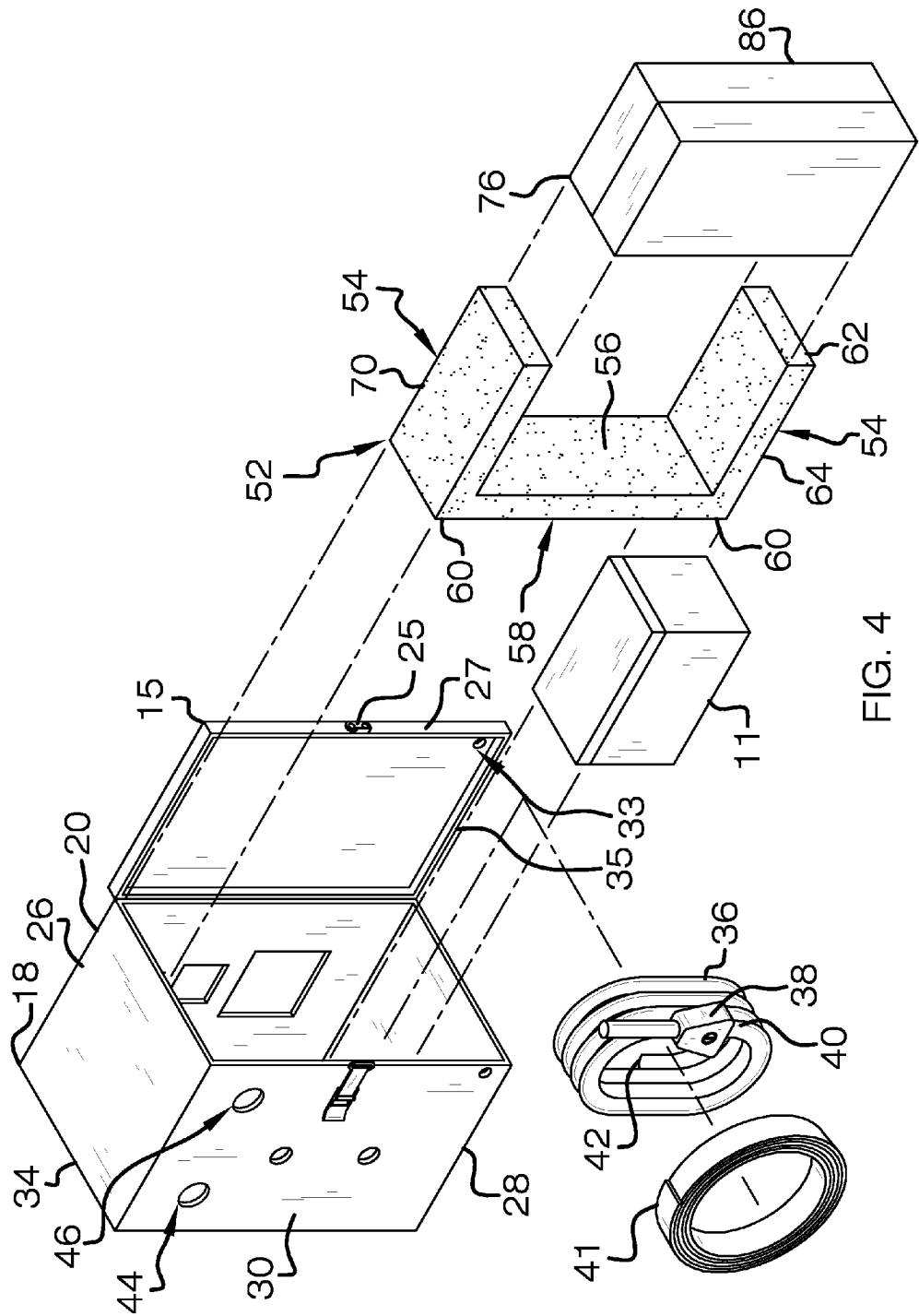
FIG. 4 is a right side exploded view of an embodiment of the disclosure.
Figure 5:
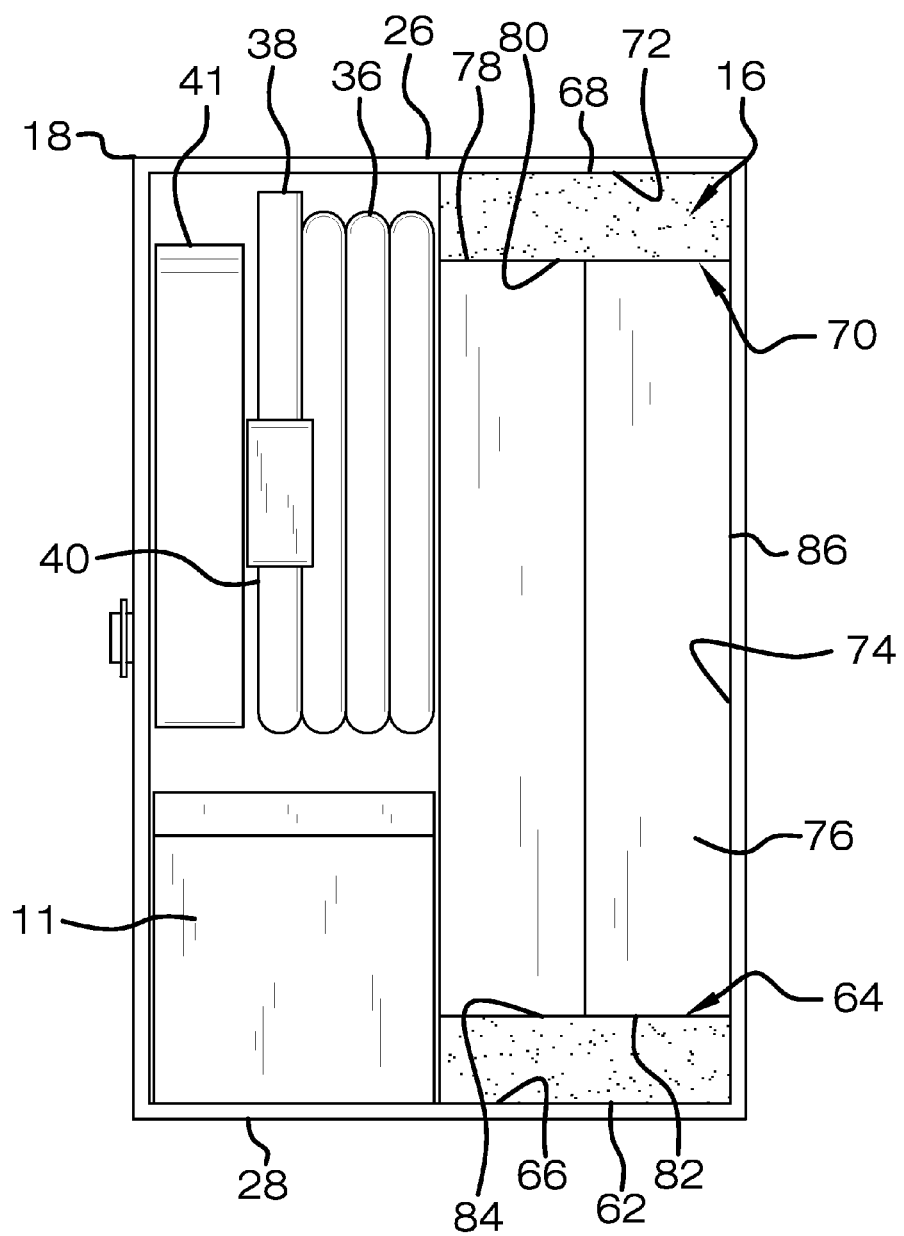
FIG. 5 is a right side view of an embodiment of the disclosure.

With reference now to the drawings, and in particular to FIGS. 1 through 5 thereof, a new protective enclosure device embodying the principles and concepts of an embodiment of the disclosure and generally designated by the reference numeral 10 will be described.

As best illustrated in FIGS. 1 through 5, the protective enclosure assembly 10 generally comprises a housing 12 that is positionable proximate a stanchion 14. The stanchion 14 may be a tree of any species. A second lateral side 16 of an outer wall 18 of the housing 12 is open to access an interior of the housing 12. The outer wall 18 of the housing 12 may have a height between 25 cm and 30 cm, a width between 15 cm and 20 cm and a depth between 12 cm and 17 cm.

A front side 20 of the outer wall 18 of the housing 12 has a camera aperture 22 extending therethrough. The camera aperture 22 is one of a plurality of the camera apertures 24. Moreover, the plurality of camera apertures 24 is evenly spaced apart so the plurality of camera apertures 24 are distributed between a top side 26 and a bottom side 28 of the outer wall 18 of the housing 12. Each of the plurality of camera apertures 24 has a width being similar to a height of the plurality of camera apertures 24 so each of the plurality of camera apertures 24 has a rectangular shape.

A back side 30 of the outer wall 18 of the housing 12 has a pair of cable apertures 32 extending therethrough. Each of the pair of cable apertures 32 is positioned proximate the top side 26 of the outer wall 18 of the housing 12. Additionally, each of the pair of cable apertures 32 is spaced apart so each of the pair of cable apertures 32 is positioned proximate an associated one of a first lateral side 34 and the second lateral side 16 of the outer wall 18 of the housing 12. Each of the pair of cable apertures 32 may have a diameter between 1 cm and 2 cm.

A cable 36 is provided. A cable lock 38 is coupled to a first end 40 of the cable 36. Continuing, a second end 42 of the cable 36 is extended through a first one of the pair of cable apertures 44 so the cable 36 extends around the stanchion 14. The second end 42 of the cable 36 is further extended through a second one of the pair of cable apertures 46 so the second end 42 of the cable 36 engages the cable lock 38. The cable lock 38 is positioned within an interior of the housing 12. The cable 36 retains the housing 12 at a selected point on the stanchion 14 so the housing 12 may not be removed from the stanchion 14.

The back side 30 of the outer wall 18 of the housing 12 has a pair of fastener apertures 48 extending therethrough. Each of the pair of fastener apertures 48 is centrally positioned on the back side 30 of the outer wall 18 of the housing 12. The pair of fastener apertures 48 are each vertically spaced apart. A pair of fasteners 50 may be extended through each of the fastener apertures 48 to engage the stanchion 14. The pair of fasteners 50 increases a stability of the housing 12 on the stanchion 14.

A spacer 52 is provided. The spacer 52 has a pair of lateral arms 54 each extending laterally away from a forward side 56 of a longitudinal arm 58 of the spacer 52. The pair of lateral arms 54 of the spacer 52 is positioned proximate an associated one of opposite ends 60 of the longitudinal arm 58 of the spacer 52 so the spacer 52 is C-shaped. The spacer 52 may be comprised of a resiliently compressible material such as foam rubber or other similar material.

The spacer 52 is positionable within the housing 12 so a bottom surface 62 of a bottom one of the pair of lateral arms 64 of the spacer 52 abuts a top surface 66 of the bottom side 28 of the outer wall 18 of the housing 12. A topmost 68 surface of a top one of the pair of lateral arms 70 of the spacer 52 abuts a bottommost surface 72 of the top side 26 of the outer wall 18 of the housing 12. The spacer 52 abuts an inside surface 74 of the front side 20 of the outer wall 18 of the housing 12 so the plurality of camera apertures 24 is positioned between each of the top 70 and bottom 64 lateral arms of the spacer 52.

A camera 76 is positionable between each of the top 70 and bottom 64 lateral arms of the spacer 52. An upper side 78 of the camera 76 abuts a basal side 80 of the top lateral arms 70 of the spacer 52. A lower side 82 of the camera 76 abuts an uppermost side 84 of the bottom lateral arm 64 of the spacer 52. A lens side 86 of the camera 76 faces the front side 20 of the outer wall 18 of the housing 12 so a lens 88 of the camera 76 is aligned with a lens one of the plurality of camera apertures 90. A flash 92 of the camera 76 is aligned with a flash one of the plurality of camera apertures 94. Additionally, a motion detector 96 of the camera 76 is aligned with a motion one of the plurality of camera apertures 98. The camera 56 may be a trail camera of any conventional design.

A camera power supply 11 is positionable within the housing 12 so the camera power supply 11 rests on the bottom side 28 of the outer wall 18 of the housing 12. The camera power supply 11 is positionable between the camera 56 and the back side 30 of the outer wall 18 of the housing 12. The camera power supply 11 is electrically coupled to the camera 56. Finally, the camera power supply 11 may be a trail camera power supply of any conventional design.

A frontward edge 13 of a door 15 is hingedly coupled to the front side 20 of the outer wall 18 of the housing 12. The door 15 is positionable in an open position so the second lateral side 16 of the outer wall 18 of the housing 12 is exposed to access the interior of the housing 12. The door 15 is positionable in a closed position so the door 15 covers the second lateral side 16 of the outer wall 18 of the housing 12. A handle 17 is coupled to a front surface 19 of the door 15. The handle 17 may be gripped to open and close the door 15.

A clasp 21 is coupled to the back side 30 of the outer wall 18 of the housing 12. A free end 23 of the clasp 21 is positioned proximate the second lateral side 16 of the outer wall 18 of the housing 12. The free end 23 of the clasp 21 engages a tab 25 coupled to a rearward edge 27 of the door 15 when the door 15 is positioned in the closed position. The clasp 27 retains the door 15 in the closed position. A lever 29 is movably coupled to a coupled end 31 of the clasp 27. The lever 29 is positionable between a locking position and a releasing position. The door 15 is tightened against the housing 12 when the lever 29 is positioned in the locking position.

The door 15 has a first lock aperture 33 extending therethrough. The first lock aperture 33 is positioned proximate an intersection of a lowermost edge 35 and the rearward edge 27 of the door 15. The back side 30 of the outer wall 18 of the housing 12 has a second lock aperture 37 extending therethrough. Continuing, the second lock aperture 37 is positioned proximate an intersection of the bottom side 28 and the second lateral side 16 of the outer wall 18 of the housing 12. A lock 39 is removably extended through each of the first 33 and second 37 lock apertures so the door 15 is locked in the closed position.

In use, the housing 12 is positioned on the stanchion 14 so the camera 76 has a view of an area to be monitored by the camera 76. The cable 36 and a strap 41 for the camera 76 are stored within the housing 12 when the housing 12 is not positioned on the stanchion 14. The housing 12 prevents an animal or person from damaging or moving the camera 76 and the camera power supply 11. Finally, the housing 12 may be left on the stanchion 14 after the camera 76 and camera power supply 11 are removed from the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A protective enclosure assembly for housing a wildlife surveillance camera such that the camera and a camera power supply are protected from damage and theft, said assembly comprising:
 a housing positionable proximate a stanchion, said housing having a camera aperture extending therethrough;
 a cable operationally coupled between said housing and the stanchion such that said housing is retained on the stanchion;
 a spacer positionable within said housing, the camera being positioned within said spacer such that the camera is retained proximate said camera aperture, said spacer being positioned between said camera and a bottom side of said housing, the camera being positionable between each of a pair of lateral arms of said spacer such that each of an upper side and a lower side of the camera abuts an uppermost side of an associated one of a pair of lateral arms of said spacer, a lens side of the camera facing a front side of an outer wall of said housing such that a lens of the camera is aligned with an associated one of a plurality of camera apertures; and
 a door operationally coupled to said housing such that said door selectively closes said housing.

2. The assembly according to claim 1, wherein a back side of an outer wall of said housing having a pair of cable apertures extending therethrough, each of said pair of cable apertures being positioned proximate a top side of said outer wall of said housing, each of said pair of cable apertures being spaced apart such that each of said pair of cable apertures is positioned proximate an associated one of a first lateral side and a second lateral side of said outer wall of said housing.

3. The assembly according to claim 1, wherein a second lateral side of an outer wall of said housing being open to access an interior of said housing.

4. The assembly according to claim 1, wherein a cable lock coupled to a first end of said cable.

5. The assembly according to claim 1, wherein a second end of said cable being extended through a first one of a pair of cable apertures such that said cable extends around the stanchion, said second end of said cable being further extended through a second one of said pair of cable apertures such that said second end of said cable engages a cable lock having said cable lock being positioned within an interior of said housing, said cable retaining said housing at a selected point on the stanchion.

6. The assembly according to claim 1, wherein said camera aperture extending through a front side of an outer wall of said housing.

7. The assembly according to claim 1, wherein said lateral arms each extending laterally away from a forward side of a longitudinal arm of said spacer, said pair of lateral arms of said spacer being positioned proximate an associated one of opposite ends of said longitudinal arm of said spacer such that said spacer is C-shaped.

8. The assembly according to claim 1, wherein a bottom surface of a bottom one of a said pair of lateral arms of said spacer abutting a top surface of a bottom side of an outer wall of said housing and a top surface of a top one of said pair of lateral arms of said spacer abutting a bottom surface of a top side of said outer wall of said housing when said spacer is positioned within an interior of said housing, said spacer abutting an inside surface of a front side of said outer wall of said housing such that a plurality of said camera apertures are positioned between each of said top and bottom lateral arms of said spacer.

9. The assembly according to claim 1, wherein a frontward edge of said door being hingedly coupled to a front side of an outer wall of said housing.

10. The assembly according to claim 1, wherein said door being positionable in a closed position such that said door covers a second lateral side of an outer wall of said housing, said door being positionable in an open position such that said second lateral side of said housing is exposed.

11. The assembly according to claim 1, wherein a clasp coupled to a back side of an outer wall of said housing such that a free end of said clasp is positioned proximate a second lateral side of said outer wall of said housing.

12. The assembly according to claim 6, wherein said camera aperture being one of a plurality of camera apertures being evenly spaced apart such that said plurality of camera apertures are distributed between a top side and a bottom side of said outer wall of said housing.

13. The assembly according to claim 11, wherein said free end of said clasp engaging a tab coupled to a rearward edge of said door when said door is positioned in a closed position such that said clasp retains said door in said closed position.

14. A protective enclosure assembly for housing a wildlife surveillance camera such that the surveillance camera and a camera power supply are protected from damage and theft, said assembly comprising:

a housing positionable proximate a stanchion, a second lateral side of an outer wall of said housing being open to access an interior of said housing, a front side of said outer wall of said housing having a camera aperture extending therethrough;

said camera aperture being one of a plurality of camera apertures being evenly spaced apart such that said plurality of camera apertures are distributed between a top side and a bottom side of said outer wall of said housing;

a back side of said outer wall of said housing having a pair of cable apertures extending therethrough, each of said pair of cable apertures being positioned proximate said top side of said outer wall of said housing, each of said pair of cable apertures being spaced apart such that each of said pair of cable apertures is positioned proximate an associated one of a first lateral side and a second lateral side of said outer wall of said housing;

a cable having a cable lock coupled to a first end of said cable, a second end of said cable being extended through a first one of said pair of cable apertures such that said cable extends around the stanchion, said second end of said cable being further extended through a second one of said pair of cable apertures such that said second end of said cable engages a cable lock having said cable lock being positioned within an interior of said housing, said cable retaining said housing at a selected point on the stanchion;

a spacer having a pair of lateral arms each extending laterally away from a forward side of a longitudinal arm of said spacer, said pair of lateral arms of said spacer being positioned proximate an associated one of opposite ends of said longitudinal arm of said spacer such that said spacer is C-shaped, said spacer being positionable within said housing such that a bottom surface of a bottom one of a pair of lateral arms of said spacer abuts a top surface of said bottom side of said outer wall of said housing and a top surface of a top one of said pair of lateral arms of said spacer abuts a bottom surface of said top side of said outer wall of said housing, said spacer abutting an inside surface of said front side of said outer wall of said housing such that said plurality of camera apertures is positioned between each of said top and bottom lateral arms of said spacer;

the camera being positionable between each of said pair of lateral arms of said spacer such that each of an upper side and a lower side of the camera abuts an uppermost side of an associated one of said pair of lateral arms of said spacer, a lens side of the camera facing said front side of said outer wall of said housing such that a lens of the camera is aligned with an associated one of said plurality of camera apertures;

a frontward edge of a door being hingedly coupled to said front side of said outer wall of said housing, said door being positionable in an open position such that said second lateral side of said outer wall of said housing is exposed to access said interior of said housing, said door being positionable in a closed position such that said door covers said second lateral side of said outer wall of said housing; and a clasp coupled to said back side of said outer wall of said housing such that a free end of said clasp is positioned proximate said second lateral side of said outer wall of said housing, said free end of said clasp engaging a tab coupled to a rearward edge of said door when said door is positioned in said closed position such that said clasp retains said door in said closed position.

\* \* \* \* \*